United States Patent [19]

Lech

[11] 4,129,148
[45] Dec. 12, 1978

[54] CLUTCH MODULATOR

[75] Inventor: Richard J. Lech, Lockport, Ill.

[73] Assignee: International Harvester Company, Chicago, Ill.

[21] Appl. No.: 811,497

[22] Filed: Jun. 30, 1977

[51] Int. Cl.² .......................................... B60K 41/00
[52] U.S. Cl. .................................. 137/596; 192/3.27; 192/3.33; 192/87.19; 192/109 F
[58] Field of Search ............. 137/596; 192/3.33, 3.27, 192/109 F, 87.19

[56] References Cited

U.S. PATENT DOCUMENTS 3,621,955   11/1971   Black et al. .................... 192/3.33 X Primary Examiner—Martin P. Schwadron
Assistant Examiner—Gerald A. Michalsky
Attorney, Agent, or Firm—Douglas W. Rudy; Ronald C. Kamp; F. David AuBuchon

[57] ABSTRACT

Modulated hydraulic clutch pack engagement is provided in a single valve body which includes a drive direction selector spool, a dump valve, a pressure modulating spool, a downstream system pressure regulator and a provision for continuous flow to a downstream torque converter. The modulator spool interrupts communication between a first and second chamber. Fluid pressure develops in the first chamber in response to selector spool initiation of clutch pack fill line pressure. A pressure differential is generated between the first and second chambers resulting in modulator spool displacement allowing equalization of chamber pressures. Metered flow to the back side of the modulator spool generates pressure that reseats the spool with the aid of spring pressure. Pressure then builds in the first chamber. The modulation is repeated rapidly resulting in the clutch pack being fully pressurized, however, the modulator will continue to regulate fluid to be supplied to the torque converter.

The dump pedal allows dumping of the pressurized clutch pack without interrupting flow between the supply pump and the torque converter.

9 Claims, 5 Drawing Figures

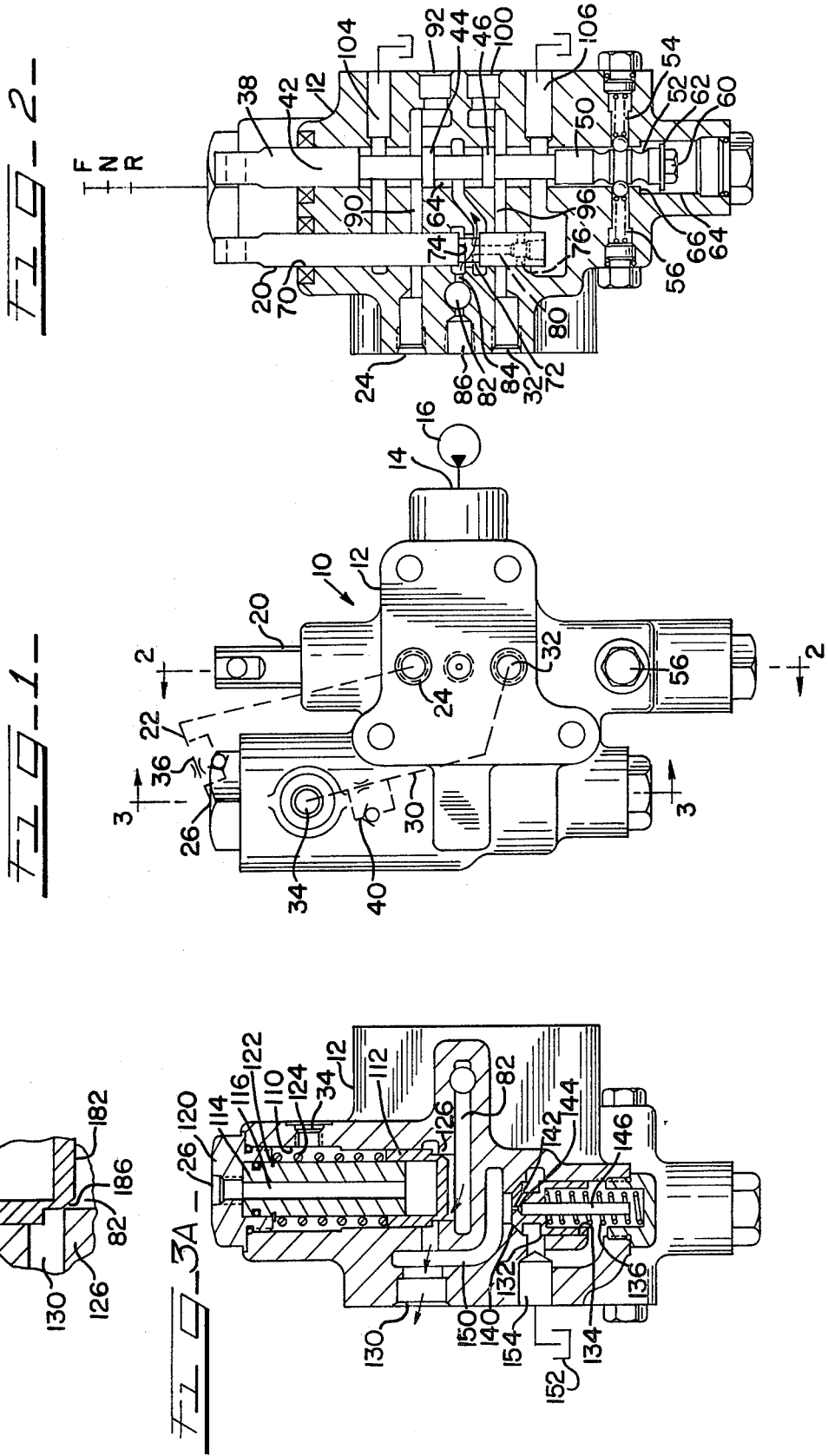

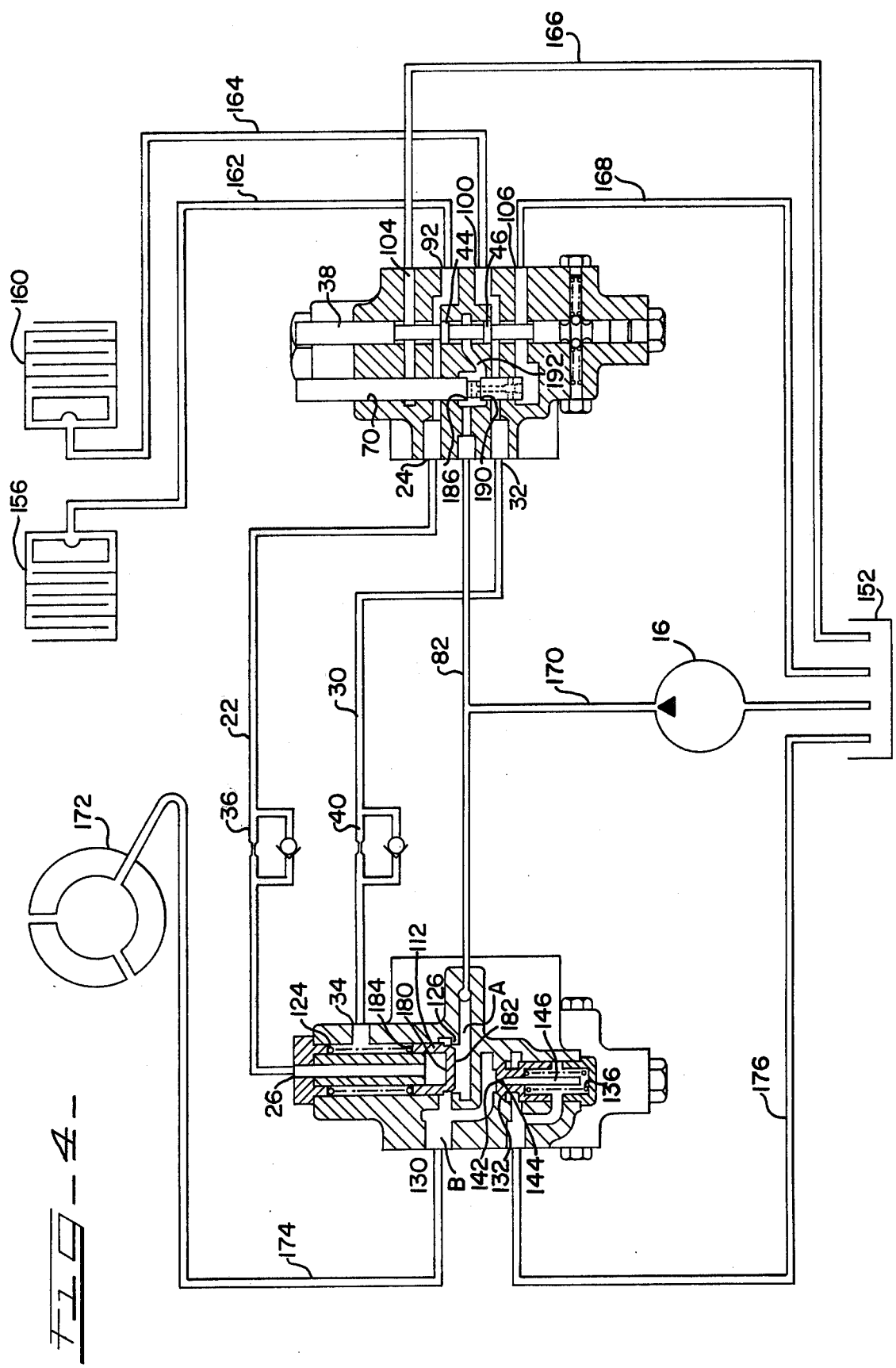

CLUTCH MODULATOR

BACKGROUND OF THE INVENTION

1. Field of the Invention

A hydralically operated clutch modulator for modulating the rate of engagement of a hydraulic clutch is provided.

2. Description of the Prior Art

Numerous prior art patents exist that attempt to provide clutch engagement modulation. There are patents, such as U.S. Pat. No. 3,351,170 to E. Hengstler, which show hydraulic clutch packs downstream of a modulating valve interposed between the clutches and a hydraulic fluid supply pump have been investigated and found operatively different when compared to the instant invention.

Prior art devices are also known where pressure is provided behind a poppet valve equivalent to pressure provided to the clutch packs until the clutch packs are fully pressurized. When fully pressurized the poppet valve also closes preventing further pressure buildup in the clutch packs. This is a rather typical embodiment but it does not allow for flow past the modulator valve (or the poppet valve) to the torque converter as does the instant invention.

BRIEF SUMMARY OF THE INVENTION

A clutch modulator valve for use in a vehicle equipped with a torque converter transmission engageable through a hydraulic clutch pack incorporates a direction selector spool valve for selectively directing fluid flow from a source of fluid pressure to one of either a forward or reverse clutch pack in order to lock up the hydraulic clutch of a vehicle in a smooth, rapid manner. A first area of a modulator valve spool is subjected to pump pressure at all times while a second area is exposed to forward clutch pack feed line pressure as the selector spool is moved to a forward position. A third modulator valve spool area is subjected to a reverse clutch pack feed line pressure when the selector spool valve is moved to a reverse direction position. The modulator valve spool continuously cycles from a closed position to an open position at a very rapid rate responsive to pressure differentials between the first area and alternatively the second or third areas. A spring in cooperation with fluid pressure urges the modulator valve spool to a closed position while the fluid pressure seen by the first area urges the modulator valve spool off its seat. Metered fluid flow is directed to the second area or alternatively to the third area whereas fluid to the first area is unencumbered.

A dump valve is provided that allows the clutch pack fluid lines to go to dump without interrupting fluid flow through the modulator valve from the pump to the torque converter.

Also provided in this cluth modulator valve is a regulator valve for regulating the downstream system pressure between the clutch modulator and the torque converter.

In the clutch modulator herein described the object is to provide a device that will control the lock up rate of a hydraulic clutch while permitting the passage of fluid to a downstream torque converter.

Also advantageous is to provide, in the same clutch modulator, potential for rapidly energizing alternatively a forward and a reverse clutch to provide rapid reversals in vehicle direction with minimum operator effort. Harsh clutch engagement can be tempered in prior art devices by modulating or accurately controlling the pressure rise in the appropriate clutch pack, however, this fine control is subject to operator error and occupies a substantial amount of time causing inefficient tractor operation.

A further significant advantage and object of this invention is to provide a clutch modulator with a dump valve that can dump both the forward and reverse clutch pack pressure heads without interrupting fluid flow from the pump to the torque converter even though the clutch modulator is interposed therebetween.

BRIEF DESCRIPTION OF THE DRAWINGS

FIG. 1 is an elevation view of the modulator valve assembly;

FIG. 2 is a cross sectional view through plane 2—2 of FIG. 1;

FIG. 3A is a cross sectional view through plane 3—3 of FIG. 1;

FIG. 3B is an enlarged view of a portion of FIG. 3A;

FIG. 4 represents a circuit incorporating one modulator valve assembly sectioned to correspond to FIGS. 2 and 3.

DETAILED DESCRIPTION OF THE INVENTION

The modulator valve assembly, generally 10 in FIG. 1 includes a modulator valve body 12, a fluid supply port 14 which may receive fluid from a hydraulic pump 16 of an appropriate type. A dump valve spool 20 protrudes from the modulator valve body. A first external conduit 22 shown in a broken line representation allows fluid communication from forward modulator fluid source port 24 to forward modulator control port 26. A second external conduit 30 allows fluid communication between a reverse modulator fluid source port 32 and a reverse modulator control port 34. First and second flow restrictions 36 and 40, allowing restricted passage of fluid in one direction and uninterrupted fluid passage in a second direction, are interposed in first and second external conduits 22 and 30 respectively.

Examination of FIGS. 1, 2 and 3 together will yield a clear understanding of the passages and spools in the modulator valve assembly. The modulator valve body 12 in FIG. 2 shows clearly a direction selector spool 38 comprising a shaft 42 having three lands 44, 46, and 50 for controlling fluid flow through the modulator valve assembly. One end of the shaft 42 is equipped with a detent portion 52 comprising three detent grooves which may be engaged by a pair of spring biased detent ball devices 54 and 56. A retainer 60 is threaded into the shaft 42 to position a limiting flange 62 which may limit the travel of the shaft in the selector valve bore 64 by contacting the decreased bore diameter ledge.

The dump valve spool 20 is slideably carried in dump valve bore 70. This spool is provided with a decreased diameter portion 72 through which a first radial passage 74 is formed. A second radial passage 76 is formed in the lower portion of the dump valve spool and is connected to the first radial passage by a longitudinal passage 80. In an undumped position as is shown in FIG. 2 fluid entering the internal passages of the dump valve spool 20 is prevented from passing therethrough as the openings of the second radial passage are blocked by the walls of the bore 70.

Both the dump valve spool 20 and the direction selector spool 38 are equipped with apertures at their upper ends for accommodating control linkages which are not shown but would be conventional.

The fluid passages shown in FIG. 2 include the supply port passage 82. This supply port passage feeds a distribution passage 84 which passes around the decreased diameter portion 72 of the dump valve spool 20 and continues into the bore 64 of the direction selector spool 38 between first 44 and second 46 lands thereof.

Item 86 is a plug.

A forward clutch supply passage 90 connects a forward clutch supply port 92 to a forward modulator fluid source port 24. A reverse clutch supply passage 96 connects a reverse clutch supply port 100 to a reverse modulator fluid source port 32.

A first drain passage 104 and a second drain passage 106 are provided. The second drain passage 106 may receive fluid through the dump valve spool 20 when it is displaced in its bore 70 such that second radial passage 76 is uncovered.

FIG. 3 is a section view through plane 3—3 of FIG. 1 showing operational equipment. The modulator valve body 12 is provided with a modulator spool bore 110 for receiving a modulator spool 112 slideably therein. A modulator spool guide 114 having an aperture 116 is maintained in axial alignment with the modulator spool bore 110 by an apertured end cap 120. A snap ring 122 is maintained in a groove in the modulator spool guide. A spring 124 urges the modulator spool 112 against seat 126.

The aligned apertures of the end cap 120 and the modulator spool guide 114 correspond to the forward modulator control port 26. The reverse modulator control port 34 communicates with the modulator spool bore 110.

Supply port passage 82 is continuous to a torque converter supply port 130 when the modulator spool 112 is off seat 126.

A regulator poppet 132 carried in a poppet bore 134 is urged by poppet spring 136 against seat 140. Orifice 142 opens into cavity 144 which is also occupied by movable dampening pin 146. The regulator poppet controls fluid pressure on the torque converter side of the modulator spool by acting responsive to pressure in regulator passage 150. When the regulator poppet 132 is unseated fluid may flow to reservoir 152 via passage 154.

The operation of the modulator valve assembly can best be understood through a perusal of FIG. 4. In this figure the clutch modulator assembly is divided into two cross sectional pieces corresponding to the FIG. 2 and 3 section views. This is done so that the operation of the valve can be easily envisioned. The valve assembly of course is only a single body as shown in the first three figures. Components shown include a forward clutch pack 156 and a reverse clutch pack 160 of conventional design including a plurality of friction discs and a piston operating in a cylinder that when pressurized locks up the clutch discs. Forward and reverse, 162 and 164, clutch pack supply lines are connected respectively to ports 92 and 100. First drain line 166 and second drain line 168 allow the first and second drain passages 104 and 106 to pass to the reservoir 152.

Hydraulic pump 16 supplies fluid to supply port passage 82 via conduit 170.

As stated earlier external conduit 22, including first flow restriction 36 provides communication between the forward modulator fluid source port 24 and the forward modulator control port 26. Likewise external conduit 30, including restriction 40, allows communication between the reverse modulator fluid source port 32 and the reverse modulator control port 34.

The torque converter 172 receives fluid from the torque converter supply port 130 via conduit 174. Passage 154 from the regulator poppet portion of the clutch modulator assembly drains to tank 152 via conduit 176.

OPERATION

With the direction selector spool 38 in a neutral position as shown hydraulic fluid from the pump 16 flows to the torque converter 172 past the unseated modulator spool. The torque converter is always provided with fluid from the pump. The pressure will be limited by the regulator poppet 132 to a preset maximum torque converter system pressure. Excess pressure will be relieved by the regulator poppet and directed to the reservoir 152.

When the direction selector spool 38 is indexed to the forward position (upwardly in the selector valve bore 64) access to the first drain passage 104 is blocked and fluid from the pump will fill the forward clutch pack 156 and at the same time flow through external conduit 22 from fluid source port 24 to control port 26. As fluid fills the forward clutch pack the modulator spool 112 is urged towards its seat 126 creating a pressure drop from supply port passage 82 (chamber A) to the torque converter supply port 130 (chamber B). This increase in chamber A pressure results in a corresponding increase in forward clutch pack pressure and modulator spool pressure due to pressure acting on area 180 of the modulator spool 172. Since the modulator spool has more pressure urging it to close due to the combined forces of pressure on area 180 and the added force supplied by spring 124, than it does to open based on pressure on area 182, it generates an even greater pressure drop from chamber A to chamber B. This regulating will continue until full pressure is realized at the clutch and a balance is reached at the modulator spool. The modulator spool 112 will be balanced to a point that allows fluid flow from the pump 16 to the torque converter 172 to be uninterrupted. This is possible as the modulator spool nose is tapered to present a varying surface area 182, as constrained by the seat 126.

The shape of the modulator spool nose is shown in the enlarged auxiliary view of FIG. 3. The seat 126 presents a square corner between the torque converter supply port 130 and the supply port passage 82. The modulator spool nose 182 comprises a relatively flat surface formed with a beveled edge 186 which presents the varying surface area with respect to the seat 126 as the spool moves vertically in the bore as shown.

The combined force of the spring 124 and pressure on area 180 exceeds the area 182 when the modulator spool is unseated thus urging the modulator spool towards its seat. However, the pressure on area 182 increases due to the pressure drop generated by the tapered nose profile of the modulator spool as it approaches its seat 126 until the force seen by area 182 is equal to the combined spring and hydraulic forces. The modulator spool will continually vacilate between various degrees of openness thus allowing fluid passage to the torque converter.

This adjusting of the modulator spool controls the buildup of pressure in the clutch pack allowing very rapid engagement without a harsh, instantaneous grabbing of the clutch.

To change direction from forward to reverse the reverse clutch pack needs to be engaged immediately after pressure locking up the forward clutch pack is relieved. The direction selector spool 38 is moved downwardly in its bore to the reverse position. The forward clutch pack 156, is drained to the reservoir 152 via fluid conduits 162, 92, 104, 166 as is the modulator spool from area 180 through 26, 36 (the unrestricted check valve side thereof), 22, 24, 104, 166. The pressure is relieved in the forward clutch pack before pressure buildup is initiated in the reverse clutch pack. This is accomplished through the placement of lands 44 and 46 on the direction selector spool 38 relative to forward and reverse clutch supply passages 92 and 100 respectively. It can be seen by looking at the drawing FIGS. 2 and 4 that as the direction selector spool 38 is moved from forward to reverse it passes through neutral where, supply port 92 communicates directly with first drain passage 104 while the fluid supply through the distributor passage 192 is blocked. This is necessary to prevent accidental pressure buildup in both clutch packs at the same time which may be deleterious to the vehicle drive line.

Of course the same protection is provided when going from reverse to forward due to the placement of the direction selector spool lands. The rise rate of the reverse clutch pack 160 pressure is controlled in the same manner as the rise rate of the forward clutch pack as explained above. Specifically second drain passage 106 is blocked by second land 46 and fluid from the pump 16 will fill the reverse clutch pack 160 and at the same time flow to the reverse modulator control port 34 through external conduit 30. As fluid fills the reverse clutch pack the modulator spool 112, due to fluid pressure acting on annular area 184 and the force of the spring, is urged toward its seat 126 creating a pressure drop from supply port passage 82 (chamber A) to the torque converter supply port 130 (chamber B). This increase in chamber A pressure results in a corresponding increase in reverse clutch pack pressure and modulator spool pressure due to the pressure acting on annular area 184 of the modulator spool 172. Once this modulating action is initiated the activity of the modulator spool here controlling the reverse clutch pack engagement, will proceed as set forth above in the description of the forward clutch pack engagement.

The dump valve spool 20, which operates as a clutch pressure unloading valve has been incorporated into the modulator valve assembly. This dump valve spool allows fluid to be drained from an engaged clutch pack through second drain passage 106 via second drain line 168 to reservoir 152 without allowing fluid from the pump to go directly to the reservoir and thus detrimentally interrupting the flow to the torque converter during an emergency stop. The dump valve lands, an upper being 186 and a lower being 190, are so spaced relative to lands of the bore 70 as to first close off communication from supply port passage 82 to distributor passage 192 then open communication between the engaged clutch pack and the reservoir. This ensures uninterrupted pump flow to the torque converter.

The operation of the regulator poppet 132 is relatively straight forward. It will be unseated when fluid pressure in chamber B exceeds torque converter capacity. When unseated, fluid will flow directly to the reservoir 152 via conduit 176. The regulator poppet action is dampened by the dampening system comprised of the movable dampening pin 146 operating in cavity or bore 144 which is opened via orifice 142 to chamber B pressure. Before the poppet is unseated the dampening pin 146 will be partially displaced outwardly from bore 144 until it reaches the extreme of its travel. This will be followed by the unseating of the poppet 132 which will be resisted by the poppet spring 136 force and dampened by the restricted flow of fluid outward from bore 144 through orifice 142 as the dampening pin is moved inwardly through the bore 144 displacing fluid therefrom. When the regulator poppet is re-seated the dampening pin will generally remain at the extreme of its travel maximizing the volume capacity of the cavity or bore 144 as even nominal fluid pressure in cavity B will urge the pin outwardly of the bore.

A typical instance where the regulator poppet will be unseated would be when full pump pressure and flow is being delivered to chamber B as the drive selector spool is held in neutral or moved from forward to reverse through neutral. The option of the pump 16 being a variable displacement pump or a fixed displacement pump will of course be determined of the amount of time the regulator spool is unseated allowing excess fluid pressure to go to dump.

Thus it has been shown that there has been provided a clutch modulator displaying all the advantages and objects as set forth above. While the invention has been described in conjunction with specific embodiments thereof it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A modulator valve assembly comprising:
   a modulator valve body having a plurality of spool receiving bores and a plurality of internal passages;
   said spool receiving bores including a direction selector spool bore, a dump valve bore, a modulator spool bore terminating in a seat and a poppet bore terminating in a seat;
   said plurality of internal passages including a first drain passage 104, a forward modulator fluid source passage 24, a forward clutch supply passage 90, a supply port passage 82, a distributor passage 192, a reverse clutch supply passage 96, a reverse modulator fluid source passage 32, a second drain passage 106, a forward modulator control passage 26, a reverse modulator control passage 34, a torque converter supply passage 130, a regulator passage 150 and a regulator drain passage 154;
   a direction selector spool slideably carried in said direction selector spool bore movable between a forward neutral and reverse positions, having a shaft equipped with a first and second land and a detent portion at one end of said direction selector spool;
   a dump valve spool slideably carried in said dump valve bore having an upper and lower dump valve lands and further provided with an internal passage made up of a first radial passage connected to a second radial passage via a longitudinal passage therebetween;
   a modulator spool slideably carried in said modulator spool bore having a tapered nose urged toward said modulator spool bore seat by a spring;
   a regulator poppet slideably carried in a poppet bore, said regulator poppet having an apertured nose allowing fluid communication to an internal bore of the poppet, said regulator poppet urged to said poppet bore seat by a spring.

2. A modulator valve assembly for modulating fluid pressure buildup in a system comprising:

a modulator valve body having a plurality of spool receiving bores and a plurality of internal passages;

said spool receiving bores including a direction selector spool bore, a dump valve bore, a primary and a secondary modulator spool bore, said primary bore having a seat and a poppet bore having a seat;

a direction selector spool slideably carried in said direction selector spool bore movable between a forward, neutral and reverse displacement, said spool including first and second lands and a detent portion at the lower end thereof;

a dump valve spool slideably carried in said dump valve bore having an upper and lower dump valve land and an internal passage originating between said upper and lower dump valve lands and terminatiing in an aperture of said lower dump valve land;

a modulator spool carried in said primary modulator spool bore having a tapered nose section and an inside area adjacent said secondary spool bore, an annular area adjacent said primary spool bore and an external area, each area subject to fluid pressure;

a modulator spool spring urging said modulator spool toward said seat of said modulator spool bore;

a regulator poppet slideably carried in said poppet bore, said poppet havng a tapered nose portion perforated by an orifice therethrough leading to a cavity inside said regulator poppet;

a regulator poppet spring urging said regulator poppet against said seat of said regulator poppet bore;

a first external conduit providing communication between said direction selector spool bore and said secondary modulator spool bore, said external conduit including a first flow restriction;

a second external conduit providing communication between said direction selector spool bore and said primary modulator spool bore, said external conduit including a second flow restriction;

a pair of chambers, A and B, adjacent each other made discontinuous by said modulator spool when seated in said modulaator spool bore;

said plurality of internal passages including a first drain passage 104 communicating with a forward modulator fluid source passage 24, a forward clutch supply passage 92 and a forward modulator control port 26 when said direction selector spool is in neutral, as well as a second drain passage 106 communicating with the reverse modulator fluid source passage 32, a reverse modulator control port 34 and a reverse clutch supply passage when said direction selector spool is in neutral;

said plurality of internal passages including a supply port passage 82 and a distributor passage 192 communicating with said direction selector spool bore, said dump valve spool bore and said chamber B;

said plurality of internal passages including a regulator passage 150 communicating with said chamber B;

a passage 154 capable of communicating with said regulator passage when said regulator poppet is off said seat of said regulator poppet bore.

3. The invention in accordance with claim 2 wherein said direction selector spool is further equipped with a travel limiting flange secured to the end of said detent portion of said spool and an aperture through the opposite end of the spool.

4. The invention in accordance with claim 2 wherein said modulator valve body includes a spring biased ball detent device operatively engageable with said detent portion of said direction selector spool.

5. The invention in accordance with claim 2 wherein said direction selector spool bore is equipped with a ledge.

6. The invention in accordance with claim 2 wherein said internal passage of said dump valve comprises a first radial passage connected to a second radial passage via a longitudinal passage therebetween.

7. The invention in accordance with claim 2 wherein said modulator spool is in a configuration of a closed ended tube, the external portion of the closed end having an angled periphery such that as said spool is urged toward said modulator spool bore seat the effective pressure seen by the external area of said spool increases, and further the effective pressure seen by the internal area and the effective pressure seen by the annular area are equal values.

8. The invention in accordance with claim 2 wherein said regulator poppet further comprises a movable dampening pin slideably carried in said cavity of said regulator poppet.

9. The invention in accordance with claim 2 wherein said first and said second flow restrictions in said respective conduits further comprise a flow restricting orifice and an unrestricted bypass ball type check valve allowing unrestricted passage towards said direction selector spool bore.

* * * * *